US011940298B2

(12) United States Patent
Froehlich et al.

(10) Patent No.: US 11,940,298 B2
(45) Date of Patent: Mar. 26, 2024

(54) MAGNET ASSEMBLY FOR A SENSOR DEVICE OF A MOTOR VEHICLE, SENSOR DEVICE WITH A MAGNET ASSEMBLY AND MOTOR VEHICLE WITH A SENSOR DEVICE

(71) Applicant: Valeo Schalter und Sensoren GmbH, Bietigheim-Bissingen (DE)

(72) Inventors: Ekkehart Froehlich, Bietigheim-Bissingen (DE); David Nemere, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 745 days.

(21) Appl. No.: 17/053,184

(22) PCT Filed: May 7, 2019

(86) PCT No.: PCT/EP2019/061605
§ 371 (c)(1),
(2) Date: Nov. 5, 2020

(87) PCT Pub. No.: WO2019/215111
PCT Pub. Date: Nov. 14, 2019

(65) Prior Publication Data
US 2021/0131826 A1    May 6, 2021

(30) Foreign Application Priority Data

May 8, 2018  (DE) .......................... 102018111046.4

(51) Int. Cl.
*G01D 5/12* (2006.01)
*B62D 15/02* (2006.01)
*G01D 11/30* (2006.01)

(52) U.S. Cl.
CPC ............. *G01D 5/12* (2013.01); *B62D 15/021* (2013.01); *G01D 11/30* (2013.01)

(58) Field of Classification Search
CPC ......... G01D 5/12; G01D 11/30; B62D 15/021
See application file for complete search history.

(56) References Cited

U.S. PATENT DOCUMENTS

| 9,702,776 | B2 * | 7/2017 | Schoepe | ................. B29C 65/08 |
| 9,810,592 | B2 | 11/2017 | Lee | |
| 2015/0211947 | A1 * | 7/2015 | Yoshida | ................. G01L 3/104 |
| | | | | 73/862.325 |
| 2017/0052077 | A1 * | 2/2017 | Lee | .......................... B62D 6/10 |

FOREIGN PATENT DOCUMENTS

| DE | 10256322 A1 | 6/2004 |
| DE | 102008014985 A1 | 9/2009 |

(Continued)

OTHER PUBLICATIONS

Notice of Reason for Rejection issued in Japanese Patent Application No. 2020-562651, dated Jan. 11, 2022 (6 pages).

(Continued)

*Primary Examiner* — Paresh Patel

(57) ABSTRACT

The invention relates to a magnet assembly (10) for a sensor device for detecting a measurement variable characterizing a rotation state of a steering shaft of a motor vehicle, to a sensor device and to a motor vehicle, wherein the magnet assembly (10) has a sleeve (11) and a magnetic element (12), which is connected in a form-fitting manner to the sleeve (11), wherein the sleeve (11) is designed for connecting the magnet assembly (10) to a first part of the steering shaft and has at least one stop flange (11C), which extends outwards in the radial direction in a radial plane, for axially securing the magnetic element (12) in a first axial direction (A1), wherein the magnetic element (12) is arranged concentrically with respect to the sleeve (11) and, with its first end side (S1), is at least partially supported axially on the stop flange (11C) and is thereby secured in the first axial direction (Continued)

Figure 1:
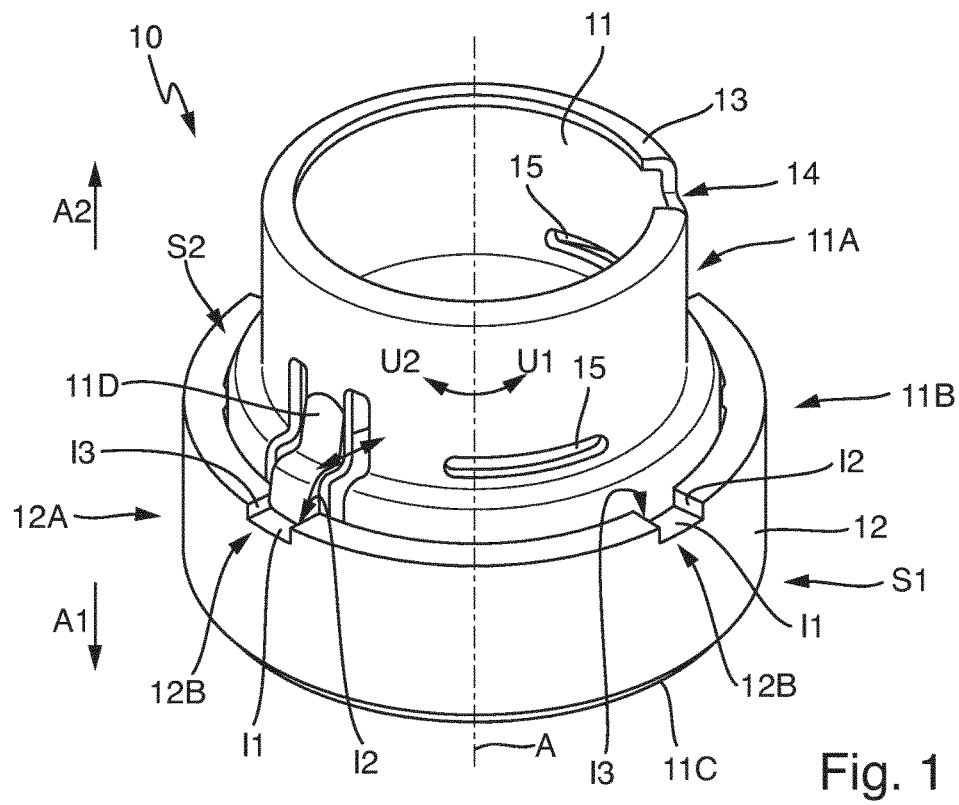

(A1). Furthermore, the magnetic element (12) is secured in the second axial direction (A2) and in the first circumferential direction (U1) and in the second circumferential direction (U2) by means of at least one latching means (11D) engaging in a recess (12B) which is open in the axial direction (A2) and has a plurality of inner surfaces (I1, I2, I3).

11 Claims, 3 Drawing Sheets

(56) References Cited

FOREIGN PATENT DOCUMENTS

| DE | 102009039082 | A1 | | 3/2011 |
|---|---|---|---|---|
| DE | 102012011876 | A1 | | 12/2013 |
| DE | 102012024383 | A1 | | 6/2014 |
| DE | 102013006567 | A1 | | 10/2014 |
| DE | 102013015452 | A1 | | 3/2015 |
| DE | 102016110774 | A1 | | 12/2017 |
| EP | 1123794 | A2 | | 8/2001 |
| EP | 01269133 | B1 | | 5/2004 |
| JP | 2010-014688 | A | | 1/2010 |
| JP | 5267033 | B2 | * | 8/2013 |
| WO | 2014/046076 | A1 | | 3/2014 |
| WO | 2016-175140 | A1 | | 11/2016 |

OTHER PUBLICATIONS

International Search Report and Written Opinion in corresponding International Application No. PCT/EP2019/061605, dated Aug. 8, 2019 (11 pages).

German Search Report in corresponding German Application No. 10 2018 111 046.4, dated Feb. 21, 2019 (8 pages).

* cited by examiner

MAGNET ASSEMBLY FOR A SENSOR DEVICE OF A MOTOR VEHICLE, SENSOR DEVICE WITH A MAGNET ASSEMBLY AND MOTOR VEHICLE WITH A SENSOR DEVICE

The invention relates to a magnet assembly for a sensor device for detecting a measurement variable characterizing a rotation state of a steering shaft of a motor vehicle, wherein the magnet assembly has a sleeve and a magnetic element, which is connected in a form-fitting manner to the sleeve. The invention also relates to a sensor device for detecting a measurement variable characterizing a rotation state of a steering shaft of a motor vehicle, and to a motor vehicle with such a sensor device.

Magnet assemblies of the type in question are used, for example, in torque sensor devices for detecting a torque applied to a steering shaft of a motor vehicle, wherein torque sensor devices of the type in question having magnet assemblies of the type in question are basically known from the prior art, for example from WO2016/175140 A1. The basic operation of such a magnet assembly is described, for example, in EP 0 1 269 133 B1. Further possible embodiments of a magnet assembly of the type in question are described in U.S. Pat. No. 9,810,592 B2.

A magnet assembly of the type in question is customarily designed here to be fastened to one of two steering shaft parts lying opposite one another in the axial direction, wherein, in order to detect the rotation state of the steering shaft, a sensor unit can be fastened on the other shaft part, with a magnetic stator, which is provided to be arranged in the radial direction opposite the magnetic element of the magnet assembly, with a small air gap in between. With the aid of the stator, the magnetic flux which occurs in the magnetic element, is dependent on the rotation state of the shaft and is intended for producing a sensor signal can be conducted from the magnetic element via a flux conductor to a magnetic sensor, for example to a Hall sensor.

Magnet assemblies of the type in question conventionally have an annular or sleeve-shaped magnetic element in the form of a permanent magnet and generally a metallic sleeve, via which the magnet assembly can be connected to the steering shaft, wherein it is known to connect the sleeve to the steering shaft for conjoint rotation, for example by means of adhesive bonding, welding, caulking or by means of a press fit.

The challenge consists here firstly in ensuring a permanently rotationally fixed connection of the magnet assembly to the steering shaft and secondly in providing a rotationally fixed connection between the magnetic element and the sleeve that is as free as possible from play.

The magnetic element of magnet assemblies of the type in question is customarily composed here of a plastic filled with magnetic particles and is generally produced in a plastics injection moulding process, alternatively also by compression moulding. It is firstly known to injection mould the magnetic element directly onto the sleeve or to injection mould the sleeve around the magnetic material. It is secondly known to first of all produce the sleeve and the magnetic element separately and to subsequently connect them to each other. This is particularly frequently undertaken in an integrally bonded manner, in particular by adhesive bonding.

Due to the generally high degree of filling with the magnetic particles, the plastic serving as the basic material for the magnetic element is generally relatively brittle or not very flexible, in particular at low temperatures. Therefore, because of the different thermal coefficients of expansion of sleeve and magnetic element, in the event of temperature fluctuations occurring during operation, in particular if the magnetic element is adhesively bonded to the sleeve, thermally induced stresses may occur in the magnet assembly and, in consequence, damage to the adhesive layer, in the worst-case scenario even failure of the adhesive layer, may occur. As a result, the magnetic element could be twisted in relation to the sleeve or could even be completely detached. The first case may lead to erroneous, but nevertheless plausible signals. In the second case, the magnetic ring in an unfavourable situation may become wedged in the steering system and may block the latter. Both cases are a safety risk and have to be avoided.

In order to secure the connection between the sleeve and the magnetic element, i.e. as a backup, WO2016/175140 A1 proposes in this connection connecting the sleeve and the magnetic element in a form-fitting manner in addition to the adhesive connection.

It is an object of the invention to provide an alternative magnet assembly, in particular a magnet assembly with an alternative, form-fitting connection between the sleeve and the magnetic element, preferably with a form-fitting connection which is particularly simple to manufacture and to produce.

This object is achieved according to the invention by a magnet assembly, by a sensor device and by a motor vehicle having the features according to the respective independent claims. Advantageous embodiments of the invention are the subject matter of the dependent patent claims, the description and the figures, and will be explained in more detail below.

A magnet assembly according to the present invention for a sensor device for detecting a measurement variable characterizing a rotation state of a steering shaft of a motor vehicle has a sleeve and a magnetic element, which is connected in a form-fitting manner to the sleeve.

The sleeve is designed here for connecting the magnet assembly to a first part of the steering shaft, in particular for the rotationally fixed connection to the steering shaft, and has at least one stop flange, which extends outwards in the radial direction in a radial plane, for axially securing the magnetic element in a first axial direction, wherein the magnetic element is of sleeve-shaped or annular design or is a magnetic ring or a magnetic sleeve and has a first end side, a second end side and a magnetically effective magnetic portion in between.

The magnetic element is arranged concentrically with respect to the sleeve and, with its first end side, is at least partially, preferably completely, supported axially on the stop flange and is thereby secured in the first axial direction.

According to the invention, the magnetic element is secured here in the second axial direction and in the first circumferential direction and in the second circumferential direction by means of at least one latching means engaging in a recess which is open in the axial direction and has a plurality of inner surfaces, wherein a first inner surface of the recess forms a stop surface in the second axial direction and secures the latching means in the second axial direction, wherein a second inner surface of the recess forms a stop surface in the first circumferential direction and secures the latching means in the first circumferential direction, and a third inner surface of the recess forms a stop surface in the second circumferential direction and secures the latching means in the second circumferential direction, in particular in each case in a form-fitting manner.

In a particularly advantageous refinement of a magnet assembly according to the invention, the first inner surface extends preferably perpendicularly to the rotation axis of the steering shaft, with respect to a state in which the magnet assembly is functionally connected to a steering shaft, while in particular the second inner surface and the third inner surface are each oriented preferably perpendicularly to the first inner surface, wherein, particularly preferably, the second inner surface and the third inner surface face each another and are arranged in particular opposite one another in parallel.

A particularly simple form-fitting securing in a plurality of directions can thereby be realized. In particular, a means of securing against rotation can thereby be realized, said means being able to be configured independently of the length tolerance of the magnetic ring or of the sleeve, and therefore being particularly secure. Furthermore, the securing according to the invention does not require any additional components.

"Form-fitting" within the context of the present invention means brought about "by the geometrical shape of the connecting parts which are operatively connected to one another, in particular are in engagement with one another".

The directional specification "axially" here denotes, in each case in a manner standard in the art, to a direction parallel to the rotation axis or axis of rotation of the steering shaft, with respect to a state in which the sleeve of the magnet assembly is connected, according to use, in a rotationally fixed manner to a first part of the steering shaft. The directional specification "circumferential direction" correspondingly denotes a rotation direction about said rotation axis, and the directional specification "radially" refers to a direction which is perpendicular to the axial direction and the circumferential direction. The directional specification "tangentially" correspondingly refers to a direction which is perpendicular to the axial direction and the radial direction.

Within the context of the present invention, the term "securing" is understood as meaning the fastening of the respective component, in particular the fixing of the component, in the direction indicated in each case in the associated relationship in a manner such that the respective component is prevented from moving/shifting in the respective direction such that a required signal quality of a sensor signal generated by the magnet assembly is ensured and a functional reliability of functions which use said sensor signal is not impaired.

For the connection to the shaft, the sleeve preferably has a bushing-shaped fastening portion, wherein the latter preferably borders a bushing-shaped connecting portion, in the region of which in particular the magnetic element is arranged and is at least partially connected to the sleeve.

In an advantageous refinement of a magnet assembly according to the invention, the fastening portion here has a smaller diameter than the connecting portion, i.e. the sleeve is preferably "offset". However, the sleeve may also be simply cylindrical.

In a particularly advantageous refinement of a magnet assembly according to the invention, the magnet assembly has in particular a plurality of latching means, preferably in each case 3, 4, 5 or 6, which are arranged distributed in the circumferential direction, in particular latching means which are arranged distributed uniformly in the circumferential direction and which engage in corresponding, associated recesses, which are likewise arranged distributed in the circumferential direction, in particular are likewise arranged distributed uniformly. This makes it possible to achieve a particularly uniform distribution of the forces and moments which occur and thus a particularly uniform distribution of stresses within the magnet assembly, as a result of which the risk of overstressing individual parts, in particular the adhesive layer and/or the magnetic element itself, can be reduced.

In some cases, it is advantageous if only one latching means according to the invention is provided and an associated recess, in which the one latching means engages, and if furthermore further recesses are provided, in which, however, no latching means engages. Said recesses can be used, for example, as an installation aid, in particular for aligning the angle of the magnetic element relative to the sleeve. In particular, further installation positions thereby arise, as a result of which the installation is simplified.

The sleeve of a magnet assembly according to the invention preferably contains metal and/or is produced from metal, wherein the sleeve is preferably at least partially produced by deep drawing. The sleeve is preferably designed in such a manner that it can be fastened on part of the steering shaft by means of a press fit or can be caulked, crimped or adhesively bonded to the part of the steering shaft. Alternatively, the sleeve can also be welded or connected by means of a press fit to the designated part of the steering shaft.

The forming of plastics connecting elements by means of caulking, in particular hot caulking or ultrasonic caulking is known in general from the prior art, and therefore further explanations in this regard are dispensed with at this juncture.

The magnetic portion of the magnetic element is preferably likewise of sleeve-shaped or annular design, in particular closed in the circumferential direction, or is designed in such a manner that it acts similarly to a magnetic portion of sleeve-shaped or annular design or like a conventional ring magnet known from the prior art, wherein the magnetic portion is preferably arranged concentrically with respect to the sleeve, wherein an inside diameter of the magnetic element is in particular larger than an outside diameter of the sleeve, and wherein the magnetic element is arranged in particular radially on the outside around the sleeve.

That is to say, the magnetic element preferably extends in the circumferential direction on the outside around the sleeve and over part of the length of the sleeve in the axial direction, wherein the magnetic element extends in particular in a region of a bushing-shaped connecting portion around the sleeve.

The magnetic element of the magnet assembly according to the invention can preferably be produced by means of an injection moulding or compression moulding process. Other customary production methods are likewise conceivable.

The magnetic element of a magnet assembly according to the invention preferably contains a plastic filled with magnetic particles and/or is composed thereof, wherein the magnetic element is preferably produced in a plastics injection moulding process. Particularly preferably, the magnetic element is adhesively bonded to the sleeve or can be connected in an integrally bonded manner to the sleeve by adhesive bonding.

In an advantageous refinement of a magnet assembly according to the invention, the stop flange is formed in an in particular completely encircling manner, i.e. in an advantageous refinement, the stop flange does not have a recess in the circumferential direction.

A stop flange without recesses in the circumferential direction is basically more rigid than a comparably designed stop flange having recesses, clearances, slots or the like. The improved rigidity enables smaller tolerances of diameter and circularity to be achieved without an additional outlay on manufacturing. Furthermore, with a flange formed in a completely encircling manner, a more stable stop can be realized and, as a result, a particularly good and uniform and in particular precise positioning and securing of the position of the magnetic element in the first axial direction can be achieved.

The magnetic element can lie and/or can be supported directly or indirectly on the stop flange, i.e. with or without one or more further components in between in the axial direction, wherein the magnetic element can lie with its complete first end side on the stop element, i.e. extensively, or just with a part of the end side, which can be achieved, for example, by means of corresponding projections on the magnetic element and/or on the stop flange.

In a further advantageous refinement of a magnet assembly according to the invention, the stop flange is preferably arranged at a first end of the sleeve or in particular forms the first end of the sleeve.

In a further advantageous refinement of a magnet assembly according to the invention, the at least one recess is a depression or clearance which is arranged on the second end side of the magnetic element and extends from an end surface of the second end side in the direction of the first end side in the axial direction and in the circumferential direction and is introduced into the magnetic element, in particular a clearance which extends in the radial direction over the entire thickness of the magnetic element into the magnetic element.

With such a recess, both securing of the magnetic element relative to the sleeve in the second axial direction and in the first and second circumferential directions can be achieved simultaneously in a particularly simple manner. This has the advantage over separate securing recesses and associated separate securing latching means, which each act only in one direction, of a lower outlay on manufacturing being incurred. Furthermore, installation is simplified since fewer securing connections have to be produced. A cost saving potential thus arises.

The at least one recess here is in particular a clearance which is open in the second axial direction, i.e. is open towards the second end side, is of U-shaped or U-like design and extends in the radial direction, in particular over the entire thickness of the magnetic element in this region, and is designed in particular similarly to a slot extending in the circumferential direction and in the axial direction.

Preferably, in particular the inner side surfaces of the recess, which at least partially extend in the axial direction and preferably perpendicular to the circumferential direction, in particular the corresponding inner surfaces of the "U" of a U-shaped or U-like recess, form the stop surfaces acting in the circumferential direction, and the base of the recess, preferably the axial stop surface on which the latching means, in particular the free end of the latching means, bears at least partially, preferably in a manner free from play.

Such a recess which can be introduced into the magnetic element in particular by a corresponding removal of material is simple to produce and permits the formation of a form-fitting connection which is particularly simple to produce and is sufficiently secure, but nevertheless can be easily enough released. Furthermore, the associated latching means does not have to have a complicated geometry in order to engage securely in the recess; a simple free end of a tab, for example of rectangular shape, suffices. Alternatively, the recess may however also be introduced as the magnetic element is being produced, in particular with the aid of corresponding tool geometry, for example of the injection moulding die, which is used for producing the magnetic element, preferably straight from the die.

In an alternative, but likewise advantageous refinement of a magnet assembly according to the invention, the at least one recess is formed in particular by an end surface portion of the second end side of the magnetic element and by two projections of the magnetic element, said projections bordering said end surface portion on the outside in each case in the circumferential direction and extending in each case in the axial direction away from the end surface on the second end side. The side surfaces of the two projections of the magnetic element, said side surfaces facing one another in the circumferential direction, preferably form the stop surfaces acting in the circumferential direction, and the end surface portion of the magnetic element that is arranged in the circumferential direction between the two projections in particular form the stop surface acting in the axial direction.

This type of refinement has the advantage that the recess can be formed as the magnetic element is being produced, in particular straight from the die, for example by injection moulding of the projections.

In a further advantageous refinement of a magnet assembly according to the invention, the at least one recess is formed in particular by a depression or clearance introduced into the magnetic element on the second end side of the magnetic element, from an end surface of the second end side in the direction of the first end side in the axial direction and circumferential direction and by two projections of the magnetic element, said projections bordering the depression or clearance on the outside in each case in the circumferential direction and extending in each case in the axial direction away from the second end side.

Preferably, in particular the side surfaces of the two projections of the magnetic element, said side surfaces facing one another in the circumferential direction, together with the inner surfaces of the depression or clearance, said inner surfaces extending at least partially in the axial direction and preferably perpendicular to the circumferential direction, form the stop surfaces acting in the circumferential direction, and the base of the depression or clearance, in particular the axial stop surface.

By this means, a sufficient depth in the axial direction and a sufficient protrusion in the radial direction can be achieved in a simple manner, and thus a good, secure form-fitting connection can be realized.

In a further advantageous refinement of a magnet assembly according to the invention, the latching means has in particular a latching arm, which extends at least partially, in particular substantially, in the axial direction and has a free end, or is formed by such a latching arm, wherein the latching arm engages with its free end in the associated recess and thereby in each case secures the magnetic element in the second axial direction and in the first circumferential direction and the second circumferential direction.

With such a latching means, a form-fitting securing of the magnetic element in relation to the sleeve in at least two circumferential directions and an axial direction can be achieved in a particularly simple manner.

Preferably, the free end of the latching arm lies here on at least one stop surface in the recess, in particular at least on the stop surface acting in the axial direction, wherein the free end of the latching arm particularly preferably lies on the stop surface acting in the axial direction and on one or on both of the stop surfaces acting in the circumferential direction.

Particularly preferably, the latching means and the recess are dimensioned here in particular in such a manner with respect to each other and the associated tolerances are selected in such a manner that, at least in at least one defined operating region, a form-fitting fixing of the magnetic element in both axial directions and both circumferential directions in relation to the sleeve, said form-fitting fixing being required for the error-free functioning of the magnet assembly, i.e. for generating a sensor signal having a defined signal quality, is ensured. In particular, the latching means and the recess are dimensioned with respect to each other in such a manner that a maximally permissible play in the axial and/or circumferential direction is not exceeded and sufficient torsional strength of the form-fitting connection between the magnetic element and the sleeve is achieved. Particularly preferably, the latching means and the recess are dimensioned with respect to each other in such a manner that at least one transition fit, in particular an interference fit, arises in the axial direction, and therefore a play-free connection is always achieved at least in the axial direction.

In a further advantageous refinement of a magnet assembly according to the invention, the latching means is connected to the sleeve, wherein the latching means is formed in particular integrally with the sleeve or forms a common component with the sleeve.

By means of such a refinement, no additional component is required and therefore no additional weight. Furthermore, the latching means can be produced simply in this way.

In a further advantageous refinement of a magnet assembly according to the invention, the latching means is in particular a latching arm, which is fastened to the sleeve or is formed integrally or in one part with the sleeve and has a free end and which extends outwards substantially in the axial direction and at least partially in the radial direction and, with its free end, in the direction of the second end side of the magnetic element.

In a further advantageous refinement of a magnet assembly according to the invention, the sleeve comprises metal or is composed thereof, and the latching arm is produced by partial severing, in particular partial punching, of a tab out of the sleeve, in particular in the region of the fastening portion, and by subsequent forming of the tab, in particular by bending of the tab, wherein the latching arm is produced and shaped in particular by bending the tab at least twice, preferably at least by bending the tab twice in an alternating manner, in particular by folding same at least twice in an alternating manner by approximately 90°.

In a state of the magnetic element connected in a form-fitting manner to the sleeve, an end surface of the free end of the tab particularly preferably lies in the axial direction on the stop surface of the recess acting in the axial direction, in order to secure the magnetic element on the sleeve in the second axial direction, in particular against shifting in the second axial direction, and in particular in order together with the stop flange to fix the magnetic element on the sleeve in the axial direction.

By means of the bending of the tab, in particular by means of the double bending, tolerances can be compensated for and in particular, in a corresponding refinement, play-free contact in the recess, in particular in the axial direction, can be produced.

In a further advantageous refinement of a magnet assembly according to the invention, the magnet element also has, on its inner circumferential surface, preferably a plurality of ribs which are arranged distributed and spaced apart from one another in particular in the circumferential direction and run in each case in the axial direction, wherein the ribs preferably extend over the entire length of the magnetic element in the axial direction.

By this means, a good centring and/or coaxial arrangement with respect to the sleeve can be achieved in a particularly simple manner and thus a precise positioning and orientation of the magnetic element, which are of substantial importance for the sensor signal quality, can be achieved in a simple manner.

A sensor device according to the invention for detecting a measurement variable characterizing a rotation state of a steering shaft of a motor vehicle has a magnet assembly according to the invention.

A motor vehicle according to the invention with a sensor device has a sensor device according to the invention with a magnet assembly according to the invention.

The advantageous refinements presented with regard to the magnet assembly and the advantages thereof also apply correspondingly to a sensor device according to the invention and to a motor vehicle according to the invention.

Further features of the invention emerge from the claims, the figures and the description of the figures. All of the features and combinations of features that are cited in the description above, and also the features and combinations of features that are cited in the description of the figures below and/or as shown in the figures alone, can be used not only in the respectively indicated combination but also in other combinations or on their own if they are technically feasible.

Figure 2:
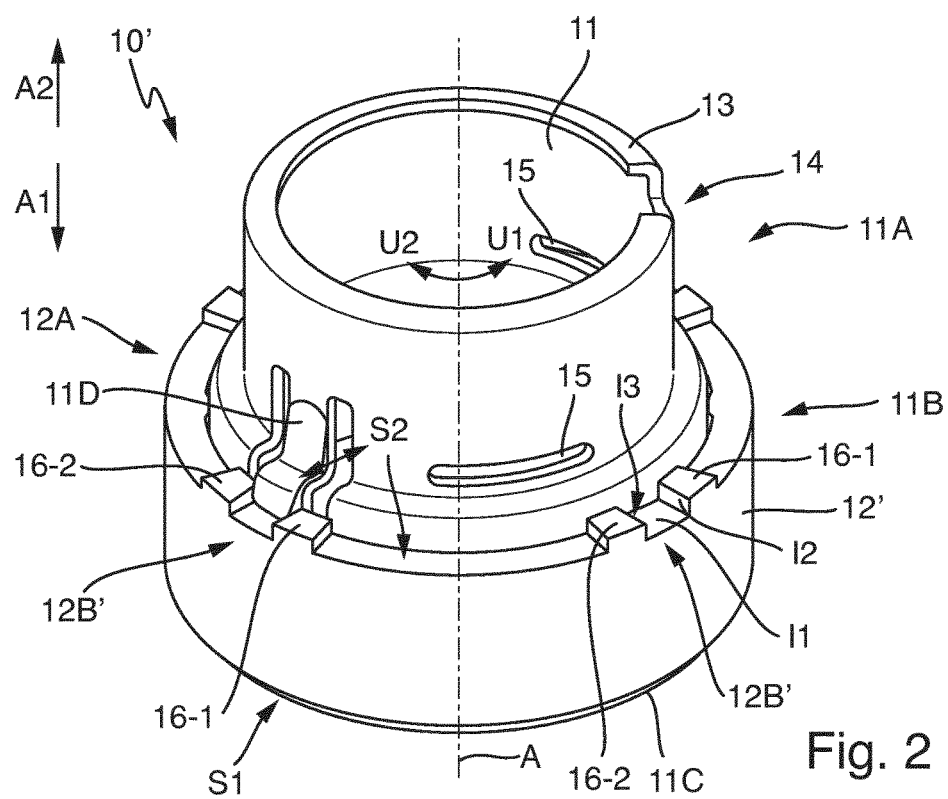
Figure 3:
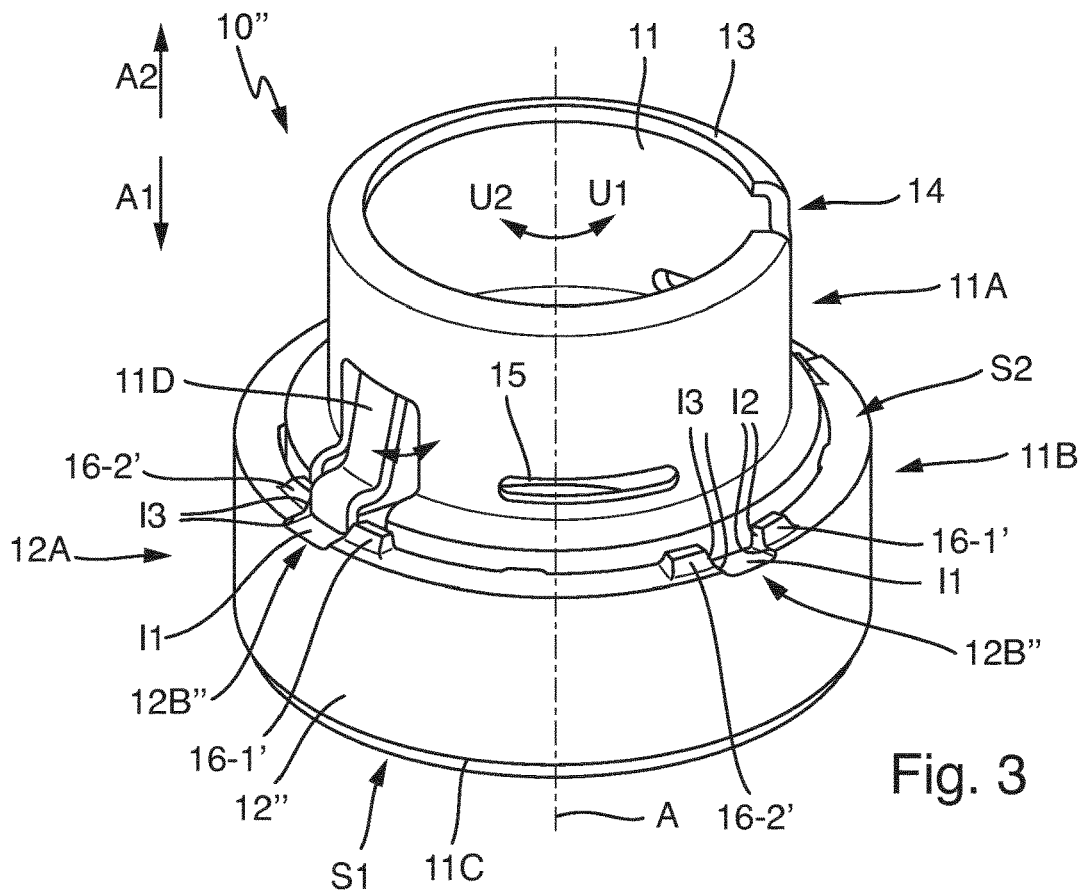
Figure 4:
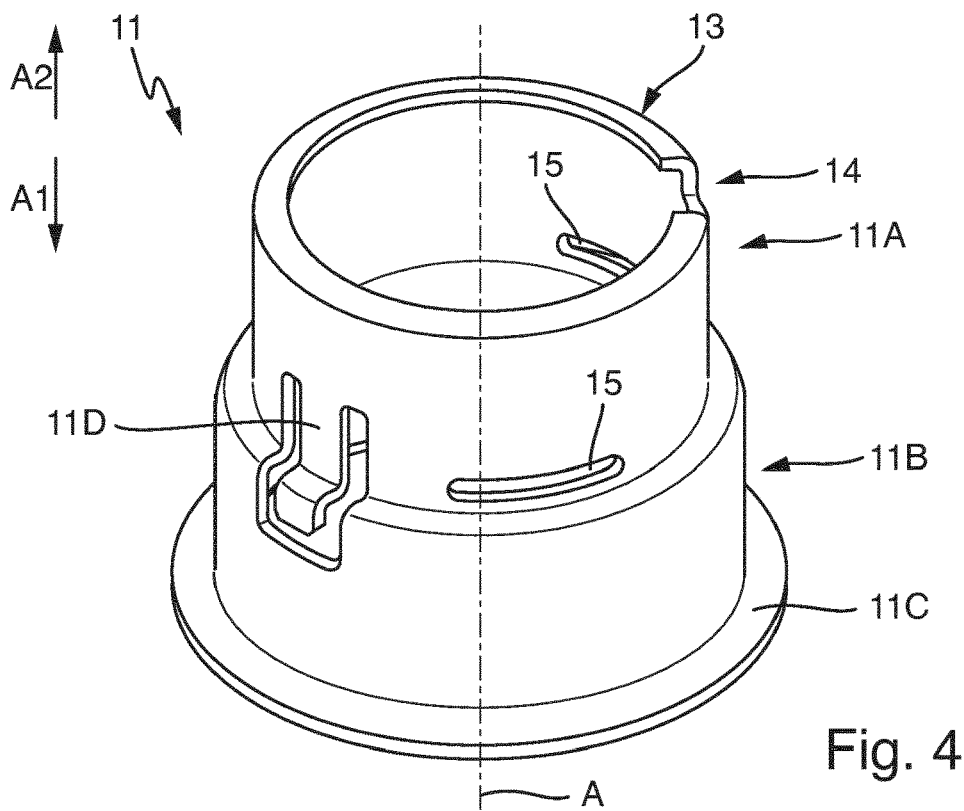
Figure 5:
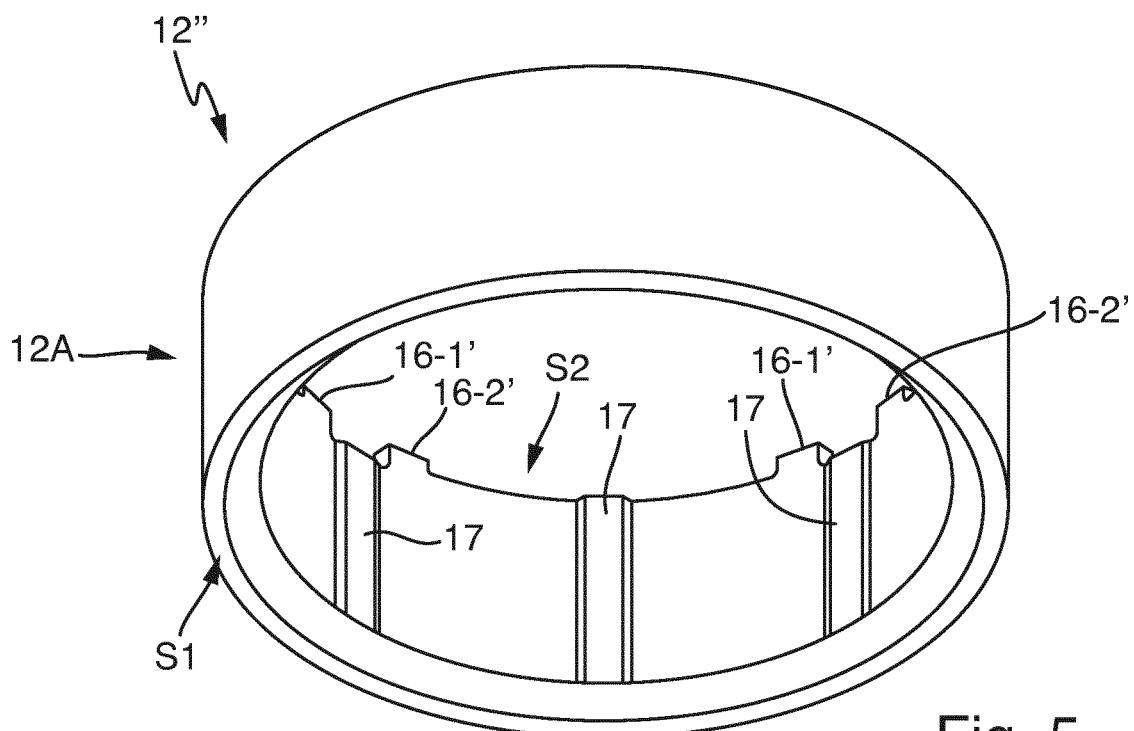
Figure 6:
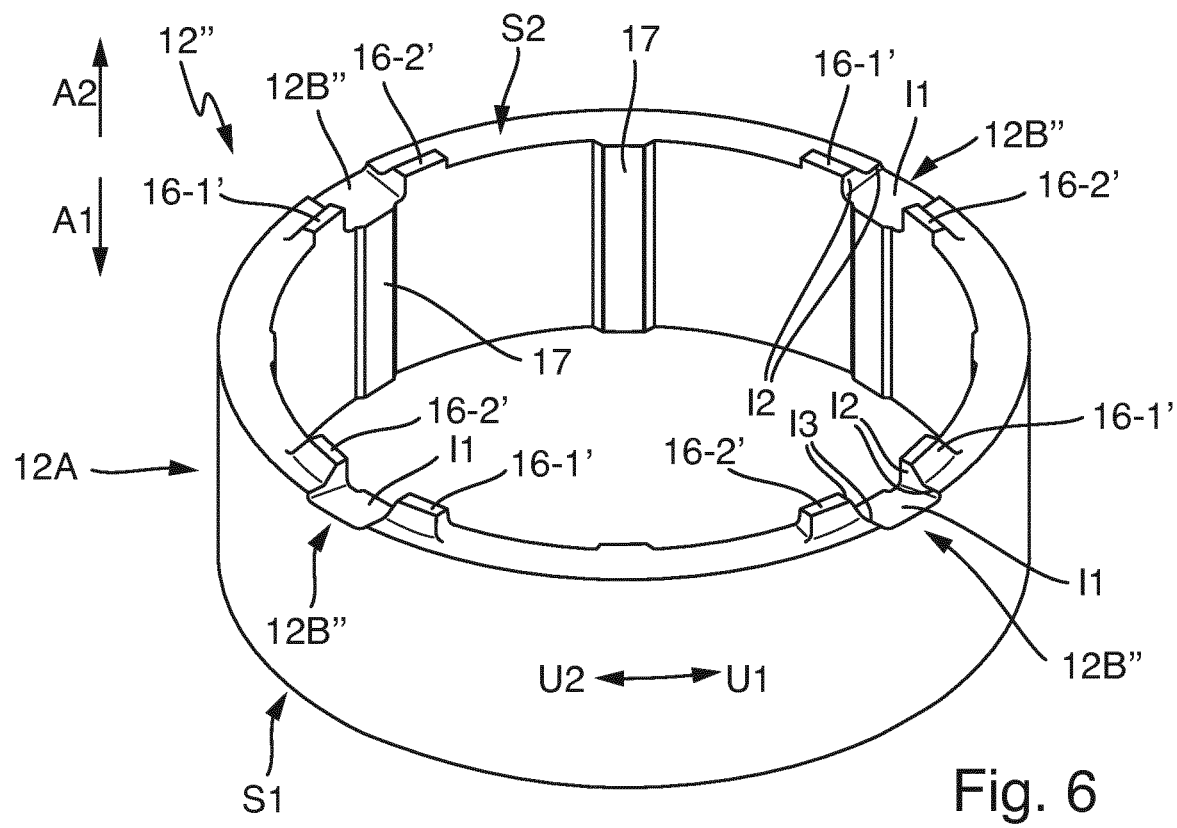

The invention will now be explained in more detail on the basis of a plurality of advantageous exemplary embodiments and with reference to the attached drawings, in which:

FIG. 1 shows a first exemplary embodiment of a magnet assembly according to the invention in a perspective illustration, FIG. 2 shows a second exemplary embodiment of a magnet assembly according to the invention in a perspective illustration, FIG. 3 shows a third exemplary embodiment of a magnet assembly according to the invention in a perspective illustration, FIG. 4 shows the sleeve of the magnet assemblies according to the invention from FIGS. 1 to 4 as an individual part in a perspective illustration, FIG. 5 shows the magnetic element of the magnet assembly according to the invention from FIG. 3 as an individual part in a first perspective illustration obliquely from below, and FIG. 6 shows the magnetic element of the magnet assembly according to the invention from FIGS. 3 and 5 in a second perspective illustration obliquely from above.

FIG. 1 shows a first exemplary embodiment of a magnet assembly 10 according to the invention with a metallic sleeve 11 and a magnetic element 12 composed of plastic filled with magnetic particles, wherein the sleeve 11 has a bushing-shaped fastening portion 11A for fastening the magnet assembly on a first part of a steering shaft (not illustrated here), which is rotatable about a rotation axis A, and a likewise bushing-shaped connecting portion 11B for connecting the sleeve 11 to the magnetic element 12, wherein the sleeve 11 is formed offset and has a larger diameter in the region of the connecting portion 11B than in the region of the fastening portion 11A. The larger outside diameter of the connecting portion 11B enables possible effects arising during the fastening of the sleeve 11 on a steering shaft, in particular distortions or the like, to be at least significantly, in particular very substantially, decoupled from the magnetic element 12 in a simple manner.

The magnetic element 12 of the magnet assembly 10 according to the invention has a magnetically effective magnetic portion 12A which is likewise of bushing- or sleeve-shaped design, wherein the magnetic element 12 is firstly connected to the sleeve 11 in an integrally bonded manner, namely by adhesive bonding in the region of the connecting portion 11B or of the effective magnetic portion 12A, and, for safety purposes, furthermore additionally in a form-fitting manner, in particular in the radial direction, in the axial direction A1, A2 and in the circumferential direction U1, U2 in order, even if the adhesive connection fails, to continue to be able to ensure a secure positioning of the components 11, 12 with respect to each other, which, inter alia, is a prerequisite for a secure and therefore usable sensor signal.

The form-fitting connection between the magnetic element 12 and the sleeve 11 in the radial direction (with respect to the rotation axis A of the steering shaft, (not illustrated here)) is produced here by the concentric arrangement of the magnetic element 12 on the outside around the sleeve 11 in the region of the connecting portion 11B.

The form-fitting connection between the magnetic element 12 and the sleeve 11 in the axial direction is achieved in a first axial direction A1 by a stop flange 11C which extends outwards in the radial direction in a radial plane perpendicular to the rotation axis A and on which the magnetic element 12 lies with its first end side S1 in the axial direction and which secures the magnetic element 12 in its position against displacement relative to the sleeve 11 in the first axial direction A1.

The securing of the magnetic element 12 in a second, opposite axial direction A2 takes place by means of a latching means 11D which is formed integrally with the sleeve 11 and is in the form of a latching arm 11D, which extends substantially in the axial direction A1, A2 and also radially outwards and has a free end and which engages in a correspondingly designed, U-shaped recess 12B having a clearance 12B pointing away from the stop flange 11C and introduced into the magnetic element 12, and lies with its end side of its free end in the region of a second end side S2 of the magnetic element 12 on a first inner surface I1 which extends perpendicularly to the axial direction A1, A2 and corresponds to the base surface of the recess 12B and thus blocks an axial displacement in the second axial direction A2 such that the magnetic element as a result is secured in both axial directions A1 and A2 and is thus completely secured in the axial direction.

The securing in the circumferential direction U1, U2, in particular in a first circumferential direction U1 and also in a second, opposite circumferential direction U2 likewise takes place by means of the latching arm 11D engaging in the recess 12B in the form of the clearance 12B, wherein, in this case, a second inner surface I2 of the U-shaped clearance 12B forms the effective stop surface in the first circumferential direction U1 and a third inner surface I3 forms the effective stop surface in the second circumferential direction U2.

By means of the combined form-fitting connection, which acts both in the second axial direction A2 and in both circumferential directions U1, U2, in the region of the second end side S2 of the magnetic element 12, securing of the adhesive connection between the magnetic element 12 and the sleeve 11 can be achieved in a particularly simple and compact manner in conjunction with a stop flange 11C, which can be produced in a simple manner, as a backup, said securing also being particularly easy to install.

As can readily be seen with reference to FIG. 1, in this exemplary embodiment only a single form-fitting connection is formed in the region of the second end side S2 between the magnetic element 12 and the sleeve 11 although the magnetic element 12 has a total of four corresponding recesses 12B. This has the background that, in this case, the required connection security can already be achieved with a single form-fitting connection. The other form-fitting connections can thus be omitted. In particular, only in each case one tab needs to be introduced into the sleeve or only one latching arm 11D formed.

The remaining three unused recesses 12B could also be dispensed with, but simplify the installation, since more selectable options for producing the respective form-fitting connection of latching means 11D and recess 12B are available and therefore a more rapid positioning of the magnetic element 12 and the sleeve 11 can be achieved.

Alternatively, however, more than one of the above-described form-fitting connections, preferably 2, 3, 4 or more, in particular up to 6, form-fitting connections can be provided in the region of the second end side, wherein, in the case of a plurality of form-fitting connections, the latter are preferably arranged distributed uniformly in the circumferential direction U1, U2.

In order to produce the described magnet assembly 10 according to the invention, first of all the sleeve 11 and the magnetic element 12 have in each case been produced separately and then joined together to form a magnet assembly 10.

The U-shaped recess 12B is introduced here into the magnetic element 12 in the axial direction from the second end side S1, in particular has already been moulded in as the magnetic element 12 is being produced, and, in this case, ends flush with the end surface on the second end side S2, said end surface bordering the recess 12B in the circumferential direction U1, U2.

The latching arm 11D has been formed by partial punching out from the sleeve and folding twice in an alternating manner, wherein the latching arm 11D is slightly flexible in the radial direction (indicated by the double arrow and the two indicated positions), and therefore it can be pushed inwards in the radial direction in order to slide the magnetic element 12 onto the sleeve for the assembly of the magnet assembly 10 or for releasing the form-fitting connection in the region of the second end side S2 and for fixing the magnetic element 12 can be pushed outwards in order to engage securely in the recess 12B and in particular to latch in the recess 12B.

In order to assemble the magnet assembly 10, the magnetic element 12, with reference to the illustration in FIG. 1, is slid from above onto the sleeve 11 until its first end side S1 makes contact with the stop flange 11C, with an adhesive having been applied before-hand between the magnetic element 12 and the sleeve 11 in the region of the connecting portion 11B in order to produce the adhesive connection between the sleeve 11 and the magnetic element 12. When the magnetic element 12 lies on the stop flange 11C, the latching arm 11D can be introduced into the recess 12B and in particular can be jammed or latched in the recess 12B.

If required, in particular in order to prevent the latching means 11D from springing back, at least one latching lug, a latching edge or a latching projection can additionally also be provided in the recess 12B, in particular on one or more inner surfaces I1, I2 and/or I3, and the latching means 11D, in particular with its free end, can engage therebehind to provide an improved form-fitting connection or to produce a latching connection.

FIG. 2 shows a second exemplary embodiment of a magnet assembly 10' according to the invention in a perspective illustration, wherein said magnet assembly 10' differs from the previously described magnet assembly 10 only in the configuration of the recess 12B' and, instead of a U-shaped clearance 12B introduced from the second end side S2 in the axial direction into the magnetic element 12', has two projections 16-1 and 16-2 which extend away from the stop flange 11C in the axial direction A2 and outwards in the radial direction and in the circumferential direction and which, together with an end surface portion forming the first inner surface of the recess 12B', define the recess 12B' in which the latching means 11D engages. The second inner surface I2 which serves as a stop surface in the first circumferential direction U1 is formed here by the projection 16-1, and the third inner surface I3 which serves as a stop surface in the second circumferential direction U2 is formed by the second projection 16-2.

FIG. 3 shows a third exemplary embodiment of a magnet assembly 10'' according to the invention in a perspective illustration, wherein said magnet assembly 10'' differs from the previously described magnet assemblies 10 and 10' inter alia in the configuration of the recess 12B'' and has a U-shaped clearance 12B introduced from the second end side S2 in the axial direction into the magnetic element 12' and two projections 16-1' and 16-2' which extend away from the stop flange 11C in the axial direction A2 and outwards in the radial direction and in the circumferential direction, wherein the clearance 12B and the projections 16-1, 16-2 together define the recess 12B''.

Furthermore, the magnetic element 12'' in this case has, on its inner circumferential surface, a plurality of ribs 17 which are arranged distributed and spaced apart from one another in the circumferential direction and each run in the axial direction, wherein the ribs 17 extend in particular over the entire length of the magnetic element 12'' in the axial direction A1, A2, see FIGS. 5 and 6. With the aid of said ribs 17, a good centring and coaxial arrangement of the magnetic element 12'' with respect to the sleeve 11 can be achieved in a particularly simple manner and thus a precise positioning and orientation of the magnetic element 12'', which are of substantial importance for the sensor signal quality, can be achieved in a simple manner.

All of the exemplary embodiments of a magnet assembly 10, 10' and 10'' according to the invention that are illustrated in FIGS. 1 to 3 and are described on the basis thereof each have a positioning flange 13 at the end of the sleeve 11 facing away from the stop flange 11C, said positioning flange 13 extending inwards in the radial direction, for a simple and precise positioning of the sleeve 11 or of the magnet assembly 10, 10', 10'' on an associated steering shaft (not illustrated), wherein the positioning flange 13 is designed here for contact on a correspondingly designed shaft shoulder or a correspondingly designed shaft segment of the associated steering shaft. In an alternative configuration of a magnet assembly according to the invention, said positioning flange 13 may be omitted.

For a simple and precise orientation of a magnet assembly 10, 10', 10'' according to the invention, in the exemplary embodiments of magnet assemblies 10, 10' and 10'' according to the invention that are illustrated in FIGS. 1 to 3 and are described on the basis thereof, a recess 14 is furthermore provided in each case in the sleeve 11 in the region of the positioning flange 13. Said recess serves in particular as a tool engagement opening 14, into which a tool, for example a screwdriver or the like can be introduced, for simpler rotation and orientation of the sleeve 11 or of the magnet assembly 10, 10', 10'' in the circumferential direction U1, U2 relative to the shaft in order to align the sleeve 11 or the magnet assembly 10, 10', 10'' with the magnetic element 12, 12', 12'' before the (rotationally fixed) fastening on the shaft in the circumferential direction U1, U2. In an alternative configuration of a magnet assembly according to the invention, said recess 14 may be omitted.

Furthermore, all of the exemplary embodiments of a magnet assembly 10, 10' and 10'' according to the invention that are illustrated and described in FIGS. 1 to 3 each have a plurality of, in the exemplary embodiments shown in each case precisely three, transverse slots 15 which are arranged distributed in the circumferential direction U1, U2, in particular distributed uniformly, and are arranged spaced apart from one another and which extend substantially in the circumferential direction U1, U2 and serve as load-relieving slots 15 during the fastening of the sleeve 11 on the steering shaft, in particular when the sleeve 11 is fastened on the shaft by caulking or crimping with the aid of corresponding caulking pins or crimping pins. In an alternative configuration of a magnet assembly according to the invention, said load-relieving slots 15 may be omitted.

In the exemplary embodiments of a magnet assembly 10, 10' and 10'' according to the invention that are illustrated in FIGS. 1 to 3 and are described on the basis thereof, the sleeve 11 is in each case offset and has different diameters of fastening portion 11A and connecting portion 11B. This configuration is likewise an advantageous configuration. The sleeve of a magnet assembly according to the invention can also have the same diameter (inside and/or outside diameter) in the fastening portion as in the connecting portion and in particular can be cylindrical over and beyond the two portions thereof, in particular over its entire length.

Alternatively, a magnet assembly is furthermore conceivable which has a latching means which is connected to, or formed integrally with, the magnetic element, preferably likewise a latching arm with a free end and a sleeve with a corresponding recess.

In this case, the latching means particularly preferably extends away from the stop flange 11C substantially in the second axial direction and the recess is in particular open in the direction of the stop flange 11C, wherein, in this case, contrary to the exemplary embodiments described, a "latching-in" of the latching means in the recess is preferably brought about by "pushing" the latching means "inwards", and release of the form-fitting connection is brought about in particular by "pushing" the latching means "outwards".

In this case, it may be advantageous if the magnetic element is a multi-component component, in particular a component produced by multi-component injection moulding, with, for example, a latching means made of a material which is more flexible than a material used for the magnetically effective portion.

FIG. 4 shows the sleeve 11 of the magnet assemblies according to the invention from FIGS. 1 to 4 as an individual part in a perspective illustration, wherein in this illustration the configuration of the stop flange 11C and of the latching arm 11D can readily be seen. In particular, it can be seen with reference to this illustration that the stop flange 11C is advantageously of completely encircling design, which in particular has an advantageous effect on the rigidity of the stop flange 11C in the axial direction and therefore also on the forces which can be supported via the stop flange 11C in the axial direction.

FIGS. 5 and 6 show the magnetic element 12'' of the magnet assembly 10'' according to the invention from FIG. 3 as an individual part in different perspective illustrations, wherein the ribs 17 which have already been mentioned further above in conjunction with FIG. 3 and are arranged on the inner side of the magnetic element 12'' and extend in the axial direction A1, A2 over the entire length of the magnetic element 12" and are provided for improved centring relative to the sleeve 11 can readily be seen in this illustration.

Of course, a multiplicity of structural modifications with respect to the explained exemplary embodiment are possible without departing from the content of the patent claims.

LIST OF REFERENCE DESIGNATIONS 10, 10', 10" magnet assembly according to the invention
11 sleeve
11A bushing-shaped fastening portion
11B bushing-shaped fastening portion
11C stop flange
11D latching means
12, 12', 12" magnetic element
12A effective magnetic portion
12B, 12B', 12B" recess for form-fitting connection to sleeve
13 positioning flange
14 tool engagement recess
15 transverse slot
16-1, 16-1', 16-1" projection with stop surface acting in the first circumferential direction
16-2, 16-2', 16-2" projection with stop surface acting in the second circumferential direction
17 rib
A rotation axis
A1 first axial direction
A2 second axial direction
I1 first inner surface
I2 second inner surface
I3 third inner surface
S1 first end side
S2 second end side
U1 first circumferential direction
U2 second circumferential direction

The invention claimed is:

1. A magnet assembly for a sensor device for detecting a measurement variable characterizing a rotation state of a steering shaft of a motor vehicle, the magnet assembly comprising:
a sleeve; and
a magnetic element, which is connected in a form-fitting manner to the sleeve,
wherein the sleeve is for connecting the magnet assembly to a first part of the steering shaft and has at least one stop flange, which extends outwards in the radial direction in a radial plane, for axially securing the magnetic element in a first axial direction,
wherein the magnetic element is one of: sleeve-shaped, annular design, a magnetic ring, and a magnetic sleeve, and has a first end side, a second end side and a magnetically effective magnetic portion in between the first end side and the second end side, and
wherein the magnetic element is arranged concentrically with respect to the sleeve and, with its first end side, is at least partially supported axially on the stop flange and is thereby secured in the first axial direction, and
wherein the magnetic element is secured in a second axial direction and in a first circumferential direction and in a second circumferential direction by at least one latching means engaging in a recess which is open in the axial direction and has a plurality of inner surfaces, wherein a first inner surface of the recess forms a stop surface in the second axial direction and secures the latching means in the second axial direction,
wherein a second inner surface of the recess forms a stop surface in the first circumferential direction and secures the latching means in the first circumferential direction, and a third inner surface of the recess forms a stop surface in the second circumferential direction and secures the latching means in the second circumferential direction, and
wherein the at least one recess is formed by an end surface portion of the second end side of the magnetic element and by two projections of the magnetic element, said projections bordering said end surface portion on the outside in each case in the circumferential direction and extending in each case in the axial direction away from the end surface portion on the second end side.

2. The magnet assembly according to claim 1, characterized in that the stop flange is formed in a completely encircling manner.

3. The magnet assembly according to claim 1, wherein the at least one recess is a depression or clearance which is arranged on the second end side of the magnetic element and extends from an end surface of the second end side in the direction of the first end side in the axial direction and in the circumferential direction and is introduced into the magnetic element.

4. The magnet assembly according to claim 1, wherein the latching means has a latching arm, which extends at least partially in the axial direction and has a free end, or is formed by such a latching arm, wherein the latching arm engages with its free end in the associated recess and thereby in each case secures the magnetic element in the second axial direction and in the first circumferential direction and the second circumferential direction in each case in a form-fitting manner.

5. The magnet assembly according to claim 4, wherein the latching means is connected to the sleeve, wherein the latching means is formed integrally with the sleeve or forms a common component with the sleeve.

6. The magnet assembly according to claim 1, the latching means comprising a latching arm, which is fastened to or is formed integrally or in one part with the sleeve and has a free end and which extends outwards substantially in the axial direction and at least partially in the radial direction and, with its free end, in the direction of the second end side of the magnetic element.

7. The magnet assembly according to claim 6, wherein the sleeve comprises metal or is composed thereof, and the latching arm is produced by partial punching, of a tab out of the sleeve in the region of the fastening portion, and subsequent forming of the tab by bending of the tab.

8. The magnet assembly according to claim 1, wherein the magnetic element has, on its inner circumferential surface, a plurality of ribs which are arranged distributed and spaced apart from one another in the circumferential direction and run in each case in the axial direction, wherein the ribs extend in particular over the entire length of the magnetic element in the axial direction.

9. A sensor device for detecting a measurement variable characterizing a rotation state of a steering shaft of a motor vehicle, the sensor device comprising: a magnet assembly according to claim 1.

10. A motor vehicle with a sensor device according to claim 9.

11. A magnet assembly for a sensor device for detecting a measurement variable characterizing a rotation state of a steering shaft of a motor vehicle, the magnet assembly comprising:
a sleeve; and
a magnetic element, which is connected in a form-fitting manner to the sleeve,
wherein the sleeve is for connecting the magnet assembly to a first part of the steering shaft and has at least one stop flange, which extends outwards in the radial direction in a radial plane, for axially securing the magnetic element in a first axial direction,
wherein the magnetic element is one of: sleeve-shaped, annular design, a magnetic ring, and a magnetic sleeve, and has a first end side, a second end side and a magnetically effective magnetic portion in between the first end side and the second end side,
wherein the magnetic element is arranged concentrically with respect to the sleeve and, with its first end side, is at least partially supported axially on the stop flange and is thereby secured in the first axial direction,
wherein the magnetic element is secured in a second axial direction and in a first circumferential direction and in a second circumferential direction by at least one latching means engaging in a recess which is open in the axial direction and has a plurality of inner surfaces,
wherein a first inner surface of the recess forms a stop surface in the second axial direction and secures the latching means in the second axial direction,
wherein a second inner surface of the recess forms a stop surface in the first circumferential direction and secures the latching means in the first circumferential direction, and a third inner surface of the recess forms a stop surface in the second circumferential direction and secures the latching means in the second circumferential direction, and
wherein the at least one recess is formed by a depression or clearance introduced into the magnetic element on the second end side of the magnetic element, from an end surface of the second end side in the direction of the first end side in the axial direction and circumferential direction and by two projections of the magnetic element, said projections bordering the depression or clearance on the outside in each case in the circumferential direction and extending in each case in the axial direction away from the second end side.

* * * * *